United States Patent
Shiro et al.

(10) Patent No.: US 12,427,663 B2
(45) Date of Patent: Sep. 30, 2025

(54) REGULATED REGION MANAGEMENT SYSTEM, MOBILE BODY MANAGEMENT SYSTEM, REGULATED REGION MANAGEMENT METHOD, AND NON-TRANSITORY STORAGE MEDIUM

(71) Applicant: TOYOTA JIDOSHA KABUSHIKI KAISHA, Toyota (JP)

(72) Inventors: Syuuhei Shiro, Nagakute (JP); Takemitsu Mori, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 352 days.

(21) Appl. No.: 18/103,058

(22) Filed: Jan. 30, 2023

(65) Prior Publication Data

US 2023/0294288 A1     Sep. 21, 2023

(30) Foreign Application Priority Data

Mar. 17, 2022   (JP) ................. 2022-041970

(51) Int. Cl.
*B25J 9/16* (2006.01)
*B25J 5/00* (2006.01)

(52) U.S. Cl.
CPC ............ *B25J 9/1666* (2013.01); *B25J 5/007* (2013.01)

(58) Field of Classification Search
CPC ....... B25J 9/1666; B25J 5/007; G05D 1/2246; G05D 1/2295; G05D 1/617;
(Continued)

(56) References Cited

U.S. PATENT DOCUMENTS 10,444,964 B2   10/2019  Sundermeyer et al.
2014/0355729 A1   12/2014  Eckert et al.
(Continued)

FOREIGN PATENT DOCUMENTS

DE   102013009258 A1   12/2014
DE   112017002154 B4   2/2020
(Continued)

OTHER PUBLICATIONS

Daisuke Sakamoto et al, Sketch and Run: A Stroke-based Interface for Home Robots, Proceedings of the 27th International Conference on Human Factors in Sketch and run, Apr. 4-9, 2009, Boston, MA, USA.

*Primary Examiner* — Ian Jen
*Assistant Examiner* — Danielle M Jackson
(74) *Attorney, Agent, or Firm* — Dinsmore & Shohl LLP

(57) ABSTRACT

A regulated region management system includes one or more processors. The one or more processors are configured to: acquire a hand-drawn input image input to an environment map; and estimate a regulated region based on the environment map and the hand-drawn input image. The regulated region is a region to which entry of a mobile body is regulated. The one or more processors are configured to: transmit regulated region information that indicates the regulated region to the mobile body when the mobile body is not remotely manipulated using a manipulation terminal; and transmit the regulated region information to the manipulation terminal when the mobile body is remotely manipulated using the manipulation terminal.

13 Claims, 15 Drawing Sheets

(58) Field of Classification Search
CPC ...... G05D 2109/10; G05B 2219/39091; G05B 2219/39172; G05B 2219/40298
See application file for complete search history.

(56) References Cited

U.S. PATENT DOCUMENTS

| | | | |
|---|---|---|---|
| 2017/0205822 A1* | 7/2017 | Shin | G05D 1/0214 |
| 2017/0341236 A1* | 11/2017 | Patrick | G05D 1/0274 |
| 2018/0263451 A1 | 9/2018 | Ortmann | |
| 2018/0312033 A1* | 11/2018 | Chu | B60H 1/32 |
| 2019/0061157 A1* | 2/2019 | Suvarna | G05D 1/0274 |
| 2019/0133396 A1 | 5/2019 | Lim et al. | |
| 2020/0379473 A1 | 12/2020 | Takahashi | |
| 2021/0178598 A1 | 6/2021 | Yamamoto | |
| 2022/0066456 A1* | 3/2022 | Ebrahimi Afrouzi | G06F 3/04883 |
| 2023/0083593 A1 | 3/2023 | Lindner et al. | |
| 2024/0246249 A1* | 7/2024 | Swann | B25J 21/00 |

FOREIGN PATENT DOCUMENTS

| | | |
|---|---|---|
| DE | 102020111325 A1 | 12/2020 |
| EP | 4151135 A1 | 3/2023 |
| JP | 2021-077053 A | 5/2021 |
| JP | 2021-094605 A | 6/2021 |

* cited by examiner

REGULATED REGION MANAGEMENT SYSTEM, MOBILE BODY MANAGEMENT SYSTEM, REGULATED REGION MANAGEMENT METHOD, AND NON-TRANSITORY STORAGE MEDIUM

CROSS-REFERENCE TO RELATED APPLICATION

This application claims priority to Japanese Patent Application No. 2022-041970 filed on Mar. 17, 2022, incorporated herein by reference in its entirety.

BACKGROUND

1. Technical Field

The present disclosure relates to a regulated region management system, a mobile body management system, a regulated region management method, and a non-transitory storage medium. In particular, the present disclosure relates to a regulated region management system, a mobile body management system, a regulated region management method, and a non-transitory storage medium for managing a regulated region for a mobile body that is autonomously movable.

2. Description of Related Art

There is known a system that updates an entry regulated region that cannot be entered by a robot that is autonomously movable based on information sensed by the robot etc. It is troublesome if the robot updates the entry regulated region in accordance with environmental changes in a complicated environment which includes people and objects, the positions of which are varied. Thus, in recent years, there has been proposed a technique in which a server updates map information as information on an entry regulated region and the server occasionally provides the map information to a robot (see Japanese Unexamined Patent Application Publication No. 2021-077053 (JP 2021-077053 A), for example).

SUMMARY

There is a need to allow a manager to intuitively designate an entry regulated region for a robot on a map. However, JP 2021-077053 A mentioned above does not disclose a method that allows a manager to designate an entry regulated region for a robot.

The present disclosure provides a regulated region management system, a mobile body management system, a regulated region management method, and a non-transitory storage medium that allow a manager to designate an entry regulated region for a mobile body that is autonomously movable through an intuitive operation.

A first aspect of the present disclosure provides a regulated region management system including one or more processors. The one or more processors are configured to: acquire a hand-drawn input image input to an environment map; and estimate a regulated region based on the environment map and the hand-drawn input image. The regulated region is a region to which entry of a mobile body is regulated. The one or more processors are configured to: transmit regulated region information that indicates the regulated region to the mobile body when the mobile body is not remotely manipulated using a manipulation terminal; and transmit the regulated region information to the manipulation terminal when the mobile body is remotely manipulated using the manipulation terminal. This allows a manager to input a regulated region through an intuitive operation. In addition, it is possible to immediately inform a subject that makes a movement plan of a regulated region that reflects a human intention. This allows real-time intervention of a human intention. In addition, it is possible to save the trouble of preparing an environment map in real time again.

In the regulated region management system according to the first aspect of the present disclosure, the one or more processors may be configured to transmit the regulated region information to the mobile body.

In the regulated region management system according to the first aspect of the present disclosure, the one or more processors may be configured to: extract coordinate information and color information from the hand-drawn input image; estimate the regulated region based on the environment map and the coordinate information; estimate a type of a regulation based on the color information; and generate information that indicates the regulated region and information that indicates the type of the regulation as the regulated region information. This enables the manager to input a regulated region in more detail.

In the regulated region management system according to the first aspect of the present disclosure, the one or more processors may be configured to transmit, when identification information on the mobile body is acquired together with the hand-drawn input image and the mobile body is not remotely manipulated using the manipulation terminal, the regulated region information to the mobile body with the identification information. The one or more processors may be configured to transmit, when the identification information on the mobile body is acquired together with the hand-drawn input image and the mobile body with the identification information is remotely manipulated, the regulated region information to the manipulation terminal that is used to remotely manipulate the mobile body with the identification information. Consequently, it is possible to flexibly apply regulations by making the regulated region different among the types of mobile bodies or among the mobile bodies.

A second aspect of the present disclosure provides a mobile body management system including: the regulated region management system according to the first aspect of the present disclosure; and the mobile body.

In the mobile body management system according to the second aspect of the present disclosure, the mobile body may be configured to generate a movement plan for autonomous movement of the mobile body based on the environment map and the regulated region information in response to receiving the regulated region information when the mobile body is autonomously moving. This allows the mobile body to autonomously move while detouring around the regulated region.

In the mobile body management system according to the second aspect of the present disclosure, the mobile body may include a movable portion that acts differently from movement of the mobile body in a travel direction. The mobile body may be configured to, when the mobile body is autonomously moving, estimate a movable range of the mobile body based on the regulated region information and the movement plan, and generate an operation plan for the movable portion of the mobile body based on the movable range. Autonomous movement of the mobile body can be suitably assisted by reflecting the regulated region information in the operation plan for the entire mobile body during the autonomous movement.

The mobile body management system according to the second aspect of the present disclosure may further include the manipulation terminal correlated with the mobile body. The manipulation terminal may be configured to display the regulated region in response to receiving the regulated region information, and transmit, when a manipulation instruction is received from a manipulator, the manipulation instruction to the corresponding mobile body. This allows the mobile body to be remotely manipulated so as to detour around the regulated region.

In the mobile body management system according to the second aspect of the present disclosure, the mobile body may be configured to generate a movement plan to detour around the regulated region, or stop moving, in a case where a prediction is made that the mobile body enters the regulated region when the mobile body moves in accordance with the manipulation instruction received from the corresponding manipulation terminal. Consequently, it is possible to reduce a burden on the manipulator, and facilitate coexistence of humans and the mobile body.

A third aspect of the present disclosure provides a regulated region management method including: acquiring a hand-drawn input image input to an environment map; and estimating a regulated region based on the environment map and the hand-drawn input image. The regulated region is a region to which entry of a mobile body is regulated. The regulated region management method includes: transmitting regulated region information that indicates the regulated region to the mobile body when the mobile body is not remotely manipulated using a manipulation terminal; and transmitting the regulated region information to the manipulation terminal when the mobile body is remotely manipulated using the manipulation terminal. This allows a manager to input a regulated region through an intuitive operation. In addition, it is possible to immediately inform a subject that makes a movement plan of a regulated region that reflects a human intention. This allows real-time intervention of a human intention. In addition, it is possible to save the trouble of preparing an environment map in real time again.

A fourth aspect of the present disclosure provides a non-transitory storage medium that stores instructions that are executable by one or more processors and that cause the one or more processors to execute functions. The functions include: acquiring a hand-drawn input image input to an environment map; and estimating a regulated region based on the environment map and the hand-drawn input image. The regulated region is a region to which entry of a mobile body is regulated. The functions includes: transmitting regulated region information that indicates the regulated region to the mobile body when the mobile body is not remotely manipulated using a manipulation terminal; and transmitting the regulated region information to the manipulation terminal when the mobile body is remotely manipulated using the manipulation terminal. This allows a manager to input a regulated region through an intuitive operation. In addition, it is possible to immediately inform a subject that makes a movement plan of a regulated region that reflects a human intention. This allows real-time intervention of a human intention. In addition, it is possible to save the trouble of preparing an environment map in real time again.

With the present disclosure, it is possible to provide a regulated region management system, a mobile body management system, a regulated region management method, and a non-transitory storage medium that allow a manager to designate an entry regulated region for a mobile body that is autonomously movable through an intuitive operation.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Issues of Embodiments

Figure 1:
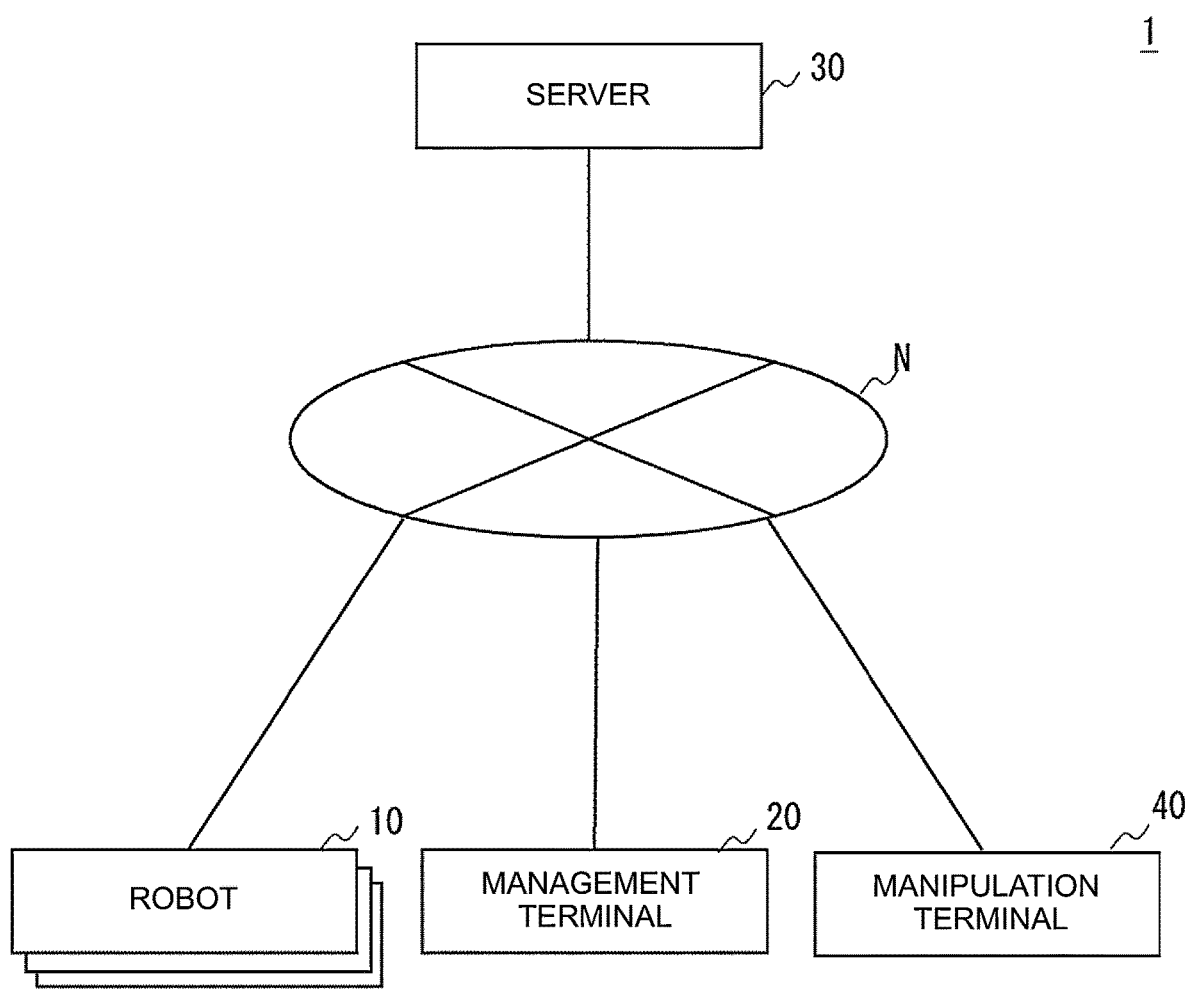
FIG. 1 is a block diagram illustrating the configuration of a mobile body management system according to a first embodiment.

One of issues of the present embodiment is described in detail. A robot makes a movement plan by determining whether the robot can pass through a region around the robot based on an environment map and information on other entry regulated regions. The environment map is held by the robot, and includes information on static entry regulated regions. The static entry regulated regions are regions in which static obstacles such as walls, columns, and other obstacles disposed in a stationary manner are present. The robot determines based on the environment map that regions determined as the static entry regulated regions are not passable, and moves while detouring around such regions. The environment map is generated beforehand based on the result of sensing by sensors mounted on the robot.

The other entry regulated regions include dynamic entry regulated regions and static entry regulated regions yet to be reflected in the environment map. The dynamic entry regulated regions are regions in which dynamic obstacles are present. Such entry regulated regions are detected by the sensors mounted on the robot. When entry regulated regions are detected, the robot determines that such regions are not passable, and moves while detouring around such regions.

However, it is necessary to prepare an environment map again each time the layout is changed or a new object is placed, which is troublesome. In addition, the environment map may occasionally not be updated in time for environmental changes.

There is a limit to the capability of the robot to detect all obstacles using the sensors. For example, it is difficult to detect thin linear objects, small steps, small holes, water pools, liquids spilled on the floor, etc. using the sensors. When a system includes a plurality of robots, it is necessary to mount a large number of sensors on all the robots in order to detect all obstacles, which is costly.

Even obstacles that can be detected using the sensors can only be detected by the onboard sensors from the vicinity of the obstacles. For example, when a path is blocked by an obstacle located ahead of a corner, it is necessary that the robot should come close to the blockage to confirm that the path is not passable, then make a movement plan again, and return through the path that the robot has passed through once. Thus, it takes time for the robot to move.

There are some locations at which there are no obstacles and the robot can physically pass but through which passage of the robot is not appropriate for human convenience. Examples of the locations through which passage of the robot is not appropriate include locations on human traffic lines, locations at which people work, and narrow paths. However, there has been no technique for moving the robot while detouring around such locations.

As described above, updating entry regulated regions in a complicated environment in which the positions of people and objects are varied involves issues. That is, update is troublesome, or may occasionally not be made in time for environmental changes, use of expensive sensors poses a significant tradeoff with cost, or locations that are not appropriate for human convenience cannot be reflected.

In order to address at least one of such issues, it is desirable that a manager should manually update entry regulated regions not reflected in the environment map. For example, it is desirable that a manager should manually update an entry regulated region that creates a bottleneck while the robot basically moves autonomously. There is a need to allow the manager to intuitively designate entry regulated regions on a map to manually update the entry regulated regions.

The following embodiments allow the manager to intuitively designate entry regulated regions.

Embodiments of the present disclosure will be described in detail below with reference to the drawings. In the drawings, like or corresponding elements are given like reference signs, and redundant description is omitted as necessary in order to clarify description.

First Embodiment

First, a first embodiment of the present disclosure will be described. FIG. 1 is a block diagram illustrating the configuration of a mobile body management system 1 according to the first embodiment. The mobile body management system 1 is a computer system that manages a mobile body.

The mobile body management system 1 includes one or more robots 10, a management terminal 20, a server 30, and a manipulation terminal 40, which are configured to be able to communicate with each other via a network N.

The network N is a wired or wireless network. The network N may be at least one of a local area network (LAN), a wide area network (WAN), the Internet, and other lines, or a combination of these.

The robot 10 is an example of a mobile body that is autonomously movable. The robot 10 holds an environment map and regulated region information. The environment map is information on a map of an environment around the robot 10. The environment map includes information on the positions of static obstacles. The regulated region information is information about regulated regions, entry to which of a mobile body is regulated. The regulated regions indicated in the regulated region information are not reflected in the environment map. The regulated regions indicated in the regulated region information may include static regulated regions and dynamic regulated regions. In the first embodiment, the regulated region information indicates information on the positions of the regulated regions. The regulated region information is received from the server 30.

The robot 10 that is autonomously moving generates a movement plan based on the environment map and the regulated region information, and autonomously moves in accordance with the movement plan.

In the first embodiment, the robot 10 can be remotely manipulated by a manipulator of the manipulation terminal 40. The robot 10 that is remotely manipulated moves in accordance with a manipulation instruction received from the manipulation terminal 40.

The management terminal 20 is a terminal device that manages regulated regions. The management terminal 20 is a tablet terminal, for example. However, the management terminal 20 is not limited thereto, and may be a smartphone or a personal computer. The management terminal 20 receives an input of a hand-drawn input image for the environment map from a manager who is a user of the management terminal 20, and transmits the received hand-drawn input image to the server 30. The hand-drawn input image is information on an image drawn on the environment map by the manager inputting using an input device such as a touch panel or a mouse.

The server 30 is a server computer which is an example of a regulated region management system. The server 30 generates regulated region information in response to receiving a hand-drawn input image input to the environment map. The server 30 transmits the regulated region information to the one or more robots 10. For the robot 10 that is remotely manipulated, the server 30 transmits the regulated region information to the manipulation terminal 40 that is used to manipulate the robot 10, in addition to the robot 10.

The manipulation terminal 40 is a terminal device that issues a manipulation instruction for remotely manipulating the robot 10. The manipulation terminal 40 is correlated with each robot 10 that is remotely manipulated. The manipulator inputs a manipulation instruction based on the environment map and the regulated region information displayed on the manipulation terminal 40. The manipulation terminal 40 that received the input manipulation instruction transmits the manipulation instruction to the robot 10.

In this manner, the robot 10 moves autonomously or is remotely manipulated based on the environment map and the regulated region information.

Figure 2:
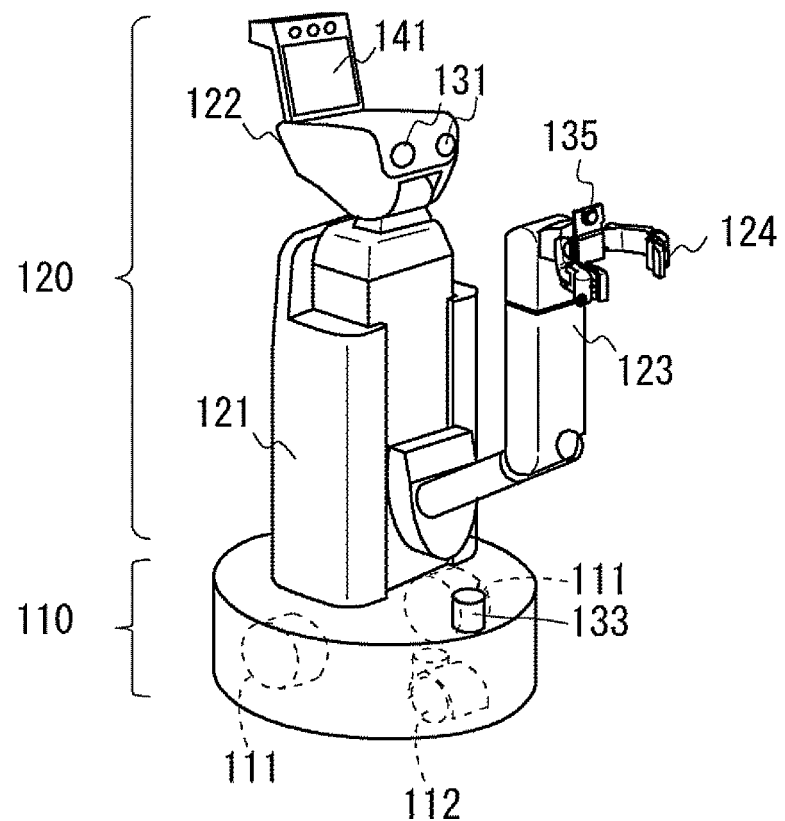
FIG. 2 is a perspective view illustrating an example of the appearance of a robot according to the first embodiment.

FIG. 2 is a perspective view illustrating an example of the appearance of the robot 10 according to the first embodiment. In FIG. 2, the appearance of the robot 10 which includes an end effector that has a grasping function is illustrated as an example of the robot 10. The robot 10 is roughly divided into a carriage portion 110 and a main body portion 120. The carriage portion 110 is a movable portion that contributes to movement of the robot 10. The carriage portion 110 includes two drive wheels 111 and one caster 112 that are supported in a cylindrical housing and contact a traveling surface. The two drive wheels 111 are disposed such that the directions of their respective rotational axes coincide with each other. The drive wheels 111 are independently driven to be rotated by a motor (not illustrated). The caster 112 is a follower wheel. The caster 112 is provided such that a turning shaft that extends in the vertical direction from the carriage portion 110 supports a wheel away from a rotational shaft for the wheel. The caster 112 follows the direction of movement of the carriage portion 110.

The carriage portion 110 includes a laser scanner 133 at the peripheral edge portion of the upper surface. The laser scanner 133 scans a certain range within a horizontal plane for each step angle, and outputs whether there is any obstacle in each direction. When there is an obstacle, the laser scanner 133 outputs the distance to the obstacle.

The main body portion 120 includes a movable portion that acts differently from movement of the robot 10 in the travel direction. Specifically, the main body portion 120 mainly includes a body portion 121 mounted on the upper surface of the carriage portion 110, a head portion 122 placed on the upper surface of the body portion 121, an arm 123 supported on the side surface of the body portion 121, a hand 124 installed at the distal end portion of the arm 123, and a hand camera 135. The arm 123 and the hand 124 are driven by a motor (not illustrated). The hand 124 grasps an object to be grasped. The body portion 121 is rotatable about a vertical axis with respect to the carriage portion 110 by using a drive force of a motor (not illustrated).

The head portion 122 mainly includes stereo cameras 131 and a display unit 141. The stereo cameras 131 include two camera units with the same angle of view. The two camera units are disposed away from each other. The stereo cameras 131 output image signals obtained by the respective camera units.

The display unit 141 is a liquid crystal panel, for example, and displays the face of a set character using animation or displays information about the robot 10 using a text or an icon.

The head portion 122 is rotatable about a vertical axis with respect to the body portion 121 using a drive force of a motor (not illustrated). Therefore, the stereo cameras 131 can capture images in a desired direction. The display unit 141 can present the display content toward a desired direction.

Figure 3:
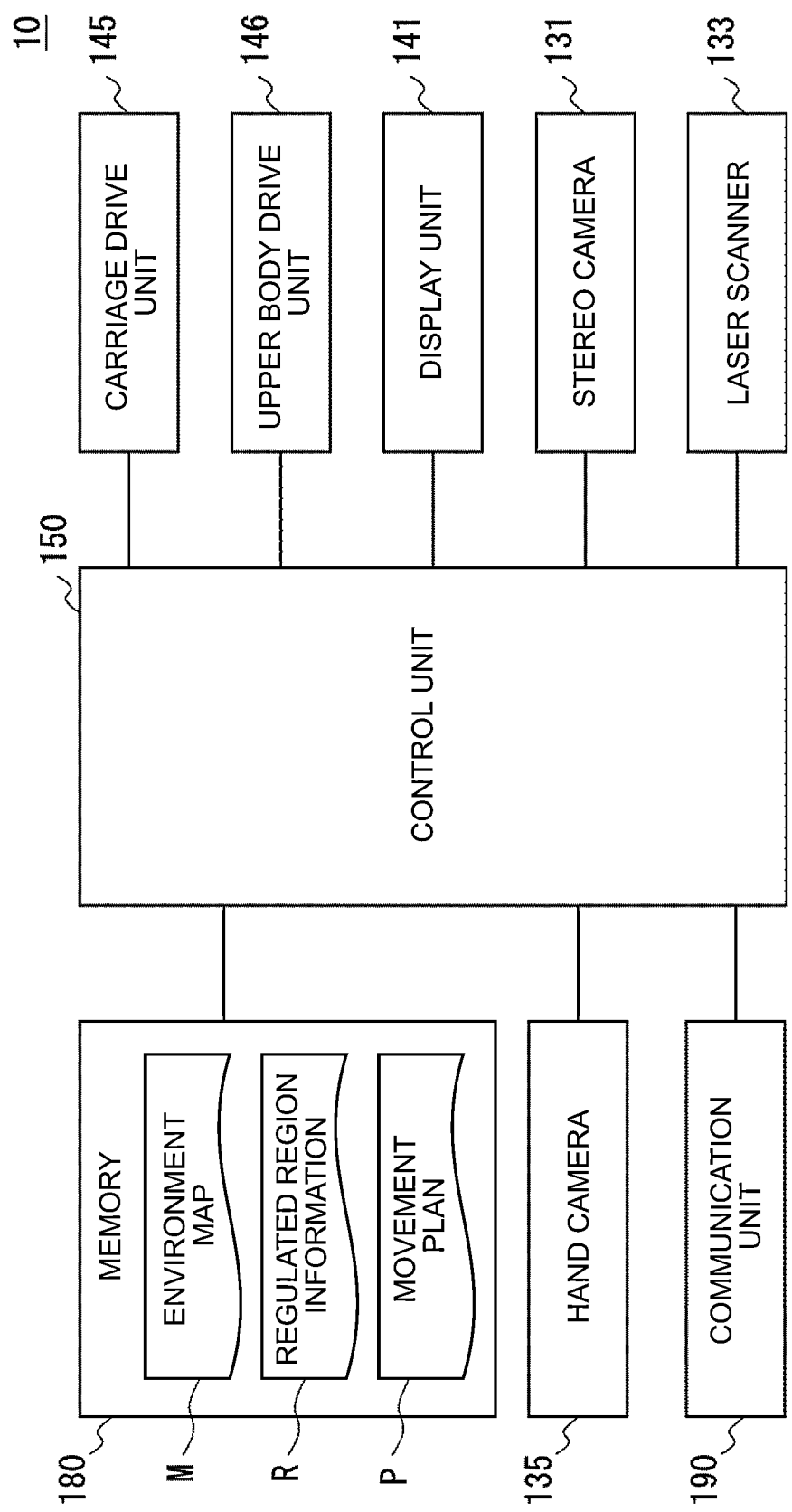
FIG. 3 is a block diagram illustrating the functional configuration of the robot according to the first embodiment.

FIG. 3 is a block diagram illustrating the functional configuration of the robot 10 according to the first embodiment. The robot 10 includes a control unit 150, a carriage drive unit 145, an upper body drive unit 146, the display unit 141, the stereo cameras 131, the laser scanner 133, a memory 180, the hand camera 135, and a communication unit 190. The upper body drive unit 146, the display unit 141, the stereo cameras 131, the laser scanner 133, and the hand camera 135 may be omitted.

The control unit 150 is at least one processor such as a central processing unit (CPU). The control unit 150 is stored in a control unit provided in the body portion 121, for example. The control unit 150 executes control of the entire robot 10 and various computation processes by executing a control program read from the memory 180.

When the communication unit 190 receives regulated region information R from the server 30, the control unit 150 stores the regulated region information R in the memory 180. Then, the control unit 150 generates a movement plan P based on an environment map M and the regulated region information R stored in the memory 180. The control unit 150 may store the generated movement plan P in the memory 180. When the laser scanner 133 to be discussed later detects an obstacle, the control unit 150 may generate a movement plan P again so as to detour around the obstacle. At this time, the control unit 150 may add the position of the obstacle to the regulated region information R.

In an autonomous movement mode, the control unit 150 executes control for rotating the drive wheels by sending a drive signal to the carriage drive unit 145 in accordance with the latest movement plan P stored in the memory 180. The control unit 150 grasps the direction and the speed of movement of the carriage portion 110 by receiving a feedback signal of an encoder etc. from the carriage drive unit 145.

The carriage drive unit 145 includes the drive wheels 111 and a drive circuit and a motor for driving the drive wheels 111.

The upper body drive unit 146 includes the arm 123, the hand 124, the body portion 121, the head portion 122, and a drive circuit and a motor for driving such components. The control unit 150 achieves expansion operation, grasping operation, and gestures by sending a drive signal to the upper body drive unit 146. The control unit 150 grasps the position and the speed of movement of the arm 123 and the hand 124 and the direction and the rotational speed of the body portion 121 and the head portion 122 by receiving a feedback signal of an encoder etc. from the upper body drive unit 146.

The display unit 141 receives and displays an image signal generated by the control unit 150.

The stereo cameras 131 capture an image of a surrounding environment in which the robot 10 is present and delivers an image signal to the control unit 150 in accordance with a request from the control unit 150. The control unit 150 executes image processing using the image signal, or converts the image signal into a captured image in accordance with a format determined in advance. The laser scanner 133 detects whether an obstacle is present in the direction of movement in accordance with a request from the control unit 150, and delivers a detection signal which indicates the detection result to the control unit 150.

The hand camera 135 is a distance image sensor, for example. The hand camera 135 is used to recognize the distance, shape, direction, etc. of the object to be grasped. The hand camera 135 includes imaging elements that perform a photoelectric conversion on an optical image that is incident from an object space. The imaging elements are arranged two-dimensionally in the hand camera 135. The hand camera 135 outputs the distance to the subject for each imaging element to the control unit 150. Specifically, the hand camera 135 includes an irradiation unit that irradiates an object space with pattern light. The hand camera 135 receives reflected light using the imaging elements, and outputs the distance to the subject captured by the imaging elements from distortion or the size of the pattern in the image. The control unit 150 grasps a scene in a wider surrounding environment using the stereo cameras 131, and grasps a scene in the vicinity of the object to be grasped using the hand camera 135.

The memory 180 is a non-volatile storage medium, and may be a solid state drive, for example. The memory 180 stores various parameter values, functions, lookup tables, etc. to be used for control and computation, besides a control program for controlling the robot 10. In particular, the memory 180 stores the environment map M, the regulated region information R, and the movement plan P.

The communication unit 190 is an interface for communication with the network N, and may be a wireless LAN unit, for example. The communication unit 190 receives the regulated region information R transmitted from the server 30, and delivers the regulated region information R to the control unit 150. The communication unit 190 may transmit the image captured by the stereo cameras 131 to the server 30 in accordance with control by the control unit 150.

Figure 4:
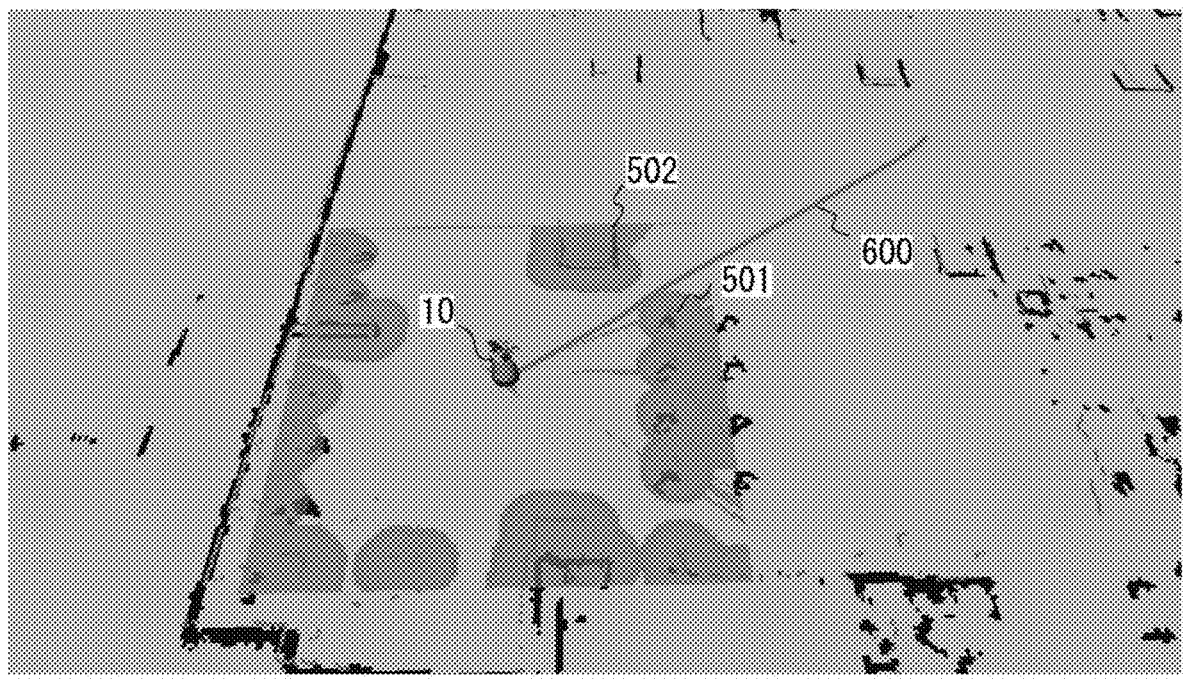
FIG. 4 is a view around the robot according to the first embodiment.
Figure 5:
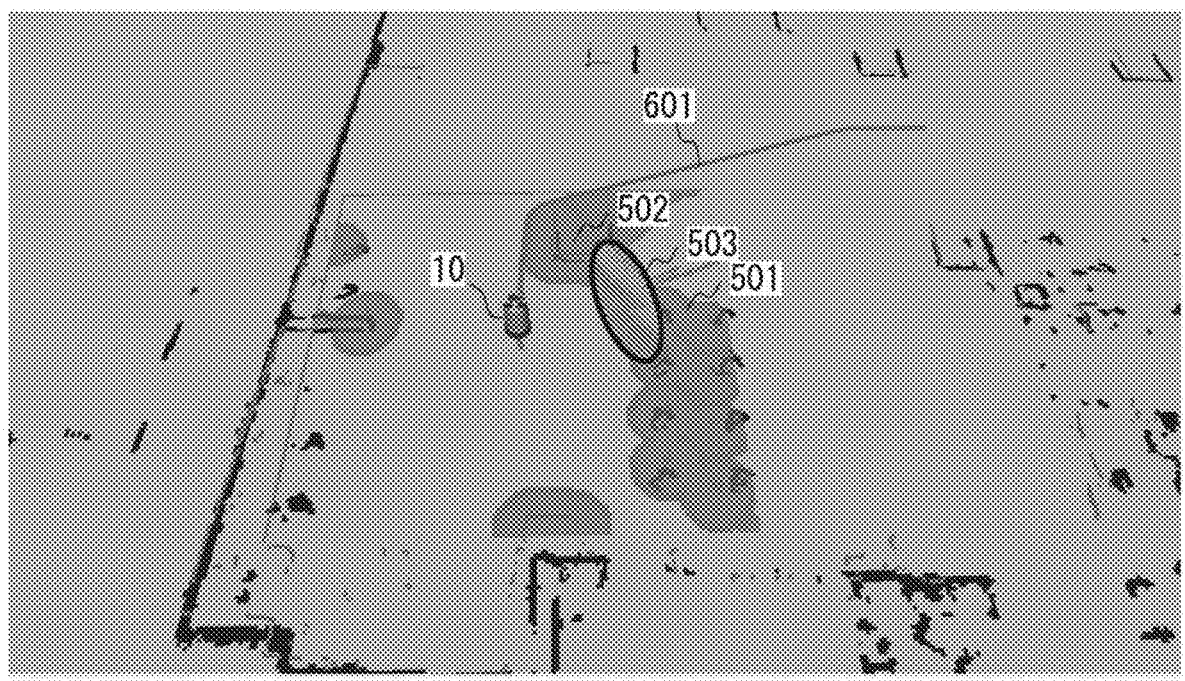
FIG. 5 is a view around the robot according to the first embodiment.

FIGS. 4 and 5 are each a view around the robot 10 according to the first embodiment. Regions in the deep color in FIGS. 4 and 5 are regions in which an obstacle is present, and are normal regulated regions. The robot 10 is traveling in a space surrounded by obstacles in the vicinity of a corner of a room. The shortest path for the robot 10 to travel toward the center of the room (upper right in FIG. 4) includes a movement path 600 that passes through a space between an obstacle 501 and an obstacle 502. Thus, the robot 10 normally includes the movement path 600 in the movement plan, and moves along the movement path 600 in accordance with the movement plan.

A case where the space between the obstacle 501 and the obstacle 502 is turned into a regulated region, such as a case where a cable is placed in the space between the obstacle 501 and the obstacle 502, for example, in addition to the normal regulated regions, is considered. In this case, the robot 10 receives regulated region information R including an additional regulated region 503 positioned between the obstacle 501 and the obstacle 502 in addition to the normal regulated regions, as illustrated in FIG. 5, from the server 30. Thus, the robot 10 makes a movement plan again so as to detour around the additional regulated region 503, in addition to the normal regulated regions, based on the new regulated region information R. The movement plan made again includes a movement path 601 that allows detouring around the regulated regions and reaching a destination through the shortest path.

This enables the robot 10 to move based on the latest regulated region information R.

Figure 6:
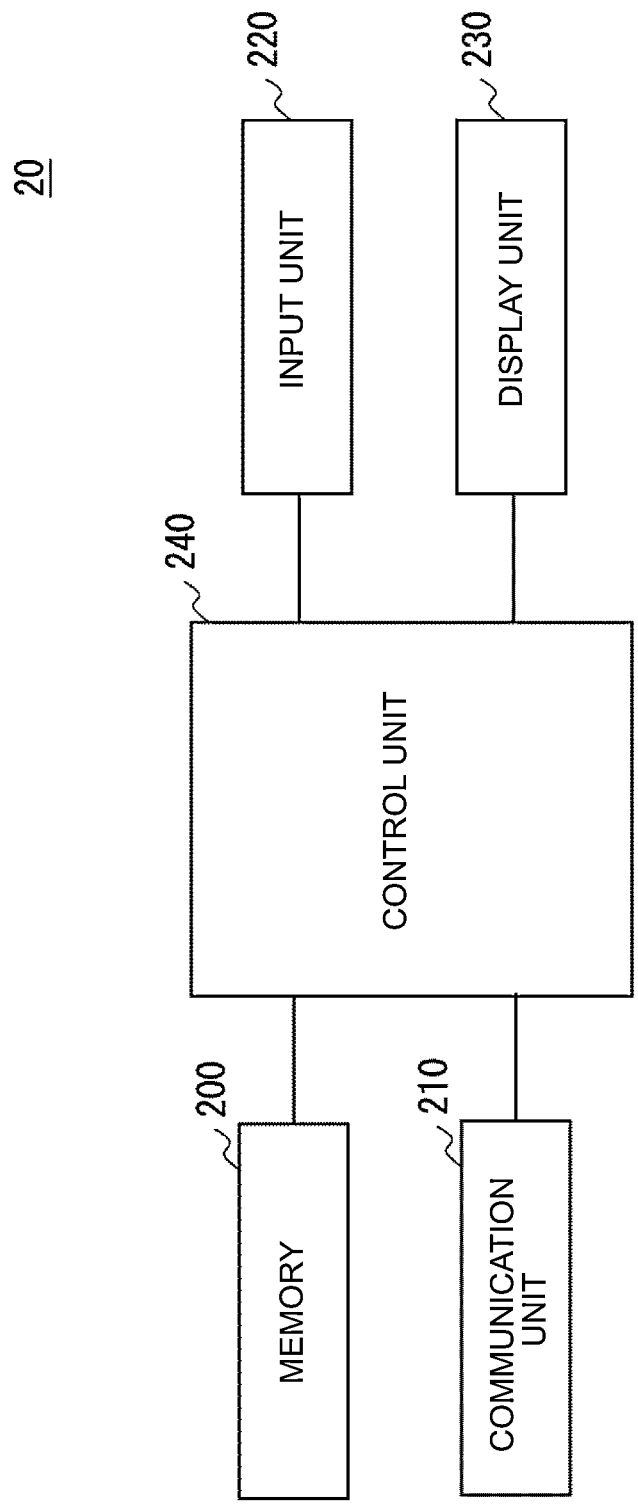
FIG. 6 is a block diagram illustrating the functional configuration of a management terminal according to the first embodiment.

FIG. 6 is a block diagram illustrating the functional configuration of the management terminal 20 according to the first embodiment. The management terminal 20 includes a memory 200, a communication unit 210, an input unit 220, a display unit 230, and a control unit 240.

The memory 200 is a non-volatile storage medium, and may be a solid state drive, for example. The memory 200 stores various parameter values, functions, lookup tables, etc. to be used for control and computation, besides a control program for controlling the management terminal 20.

The communication unit 210 is an interface for communication with the network N. The communication unit 210 receives an environment map transmitted from the server 30, and delivers the environment map to the control unit 240. The communication unit 210 transmits a hand-drawn input image as correlated with the environment map to the server 30, in cooperation with the control unit 240.

The input unit 220 includes a touch panel disposed as superimposed on the display unit 230, push buttons provided at the peripheral edge portion of the display unit 230, etc. The input unit 220 receives a hand-drawn input image input by the manager to designate a regulated region by touching the touch panel, and delivers the hand-drawn input image to the control unit 240.

The display unit 230 may be a liquid crystal panel, for example. The display unit 230 displays an environment map transmitted from the server 30, for example. The display unit 230 also displays the input hand-drawn input image as superimposed on the environment map.

The control unit 240 is a processor such as a CPU, and executes control of the entire management terminal 20 and various computation processes by executing a control program read from the memory 200.

Figure 7:
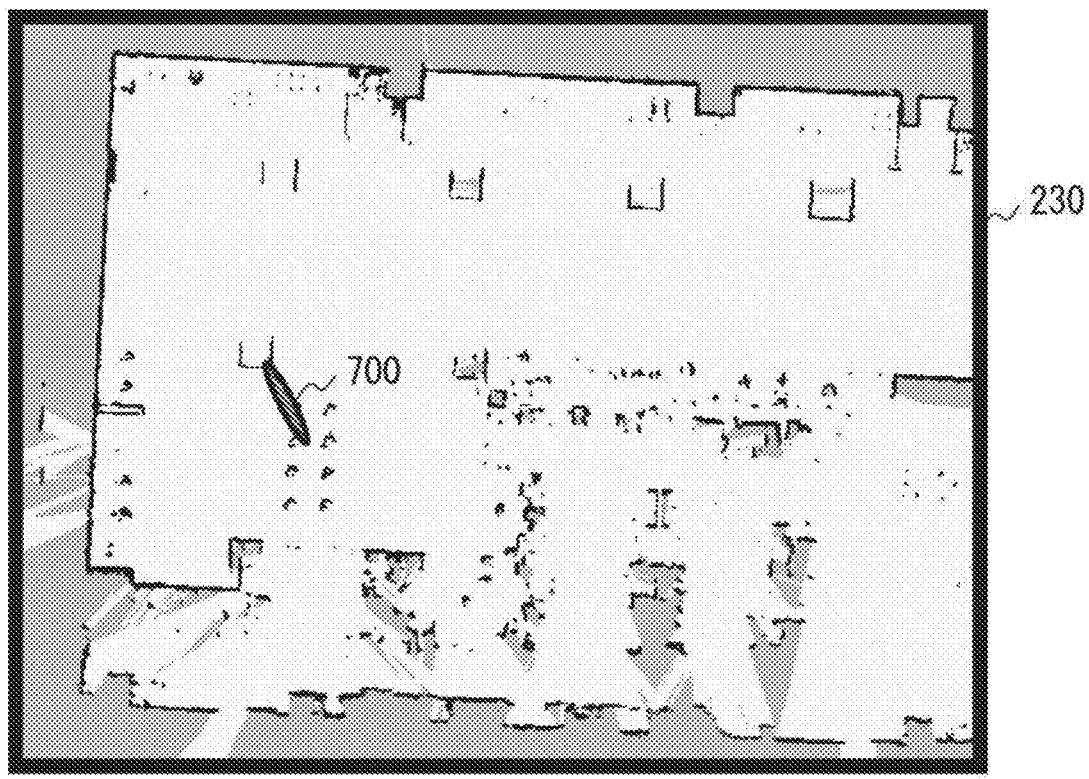
FIG. 7 illustrates an example of a hand-drawn input image according to the first embodiment.

FIG. 7 illustrates an example of the hand-drawn input image according to the first embodiment. The display unit 230 of the management terminal 20 displays an environment map within a predetermined range with reference to the present position of the robot 10. The manager inputs a hand-drawn input image 700 onto the displayed environment map.

A method of inputting a hand-drawn input image includes directly inputting a hand-drawn input image by touching a relevant portion on the touch panel using a finger of the user, a stylus pen, etc. However, the method of inputting a hand-drawn input image is not limited thereto. For example, a hand-drawn input image may be input by selecting a predetermined figure using a mouse etc. and designating the position and the size of the figure. A hand-drawn input image may be input as a two-dimensional line or figure, or may be input as a three-dimensional object.

Figure 8:
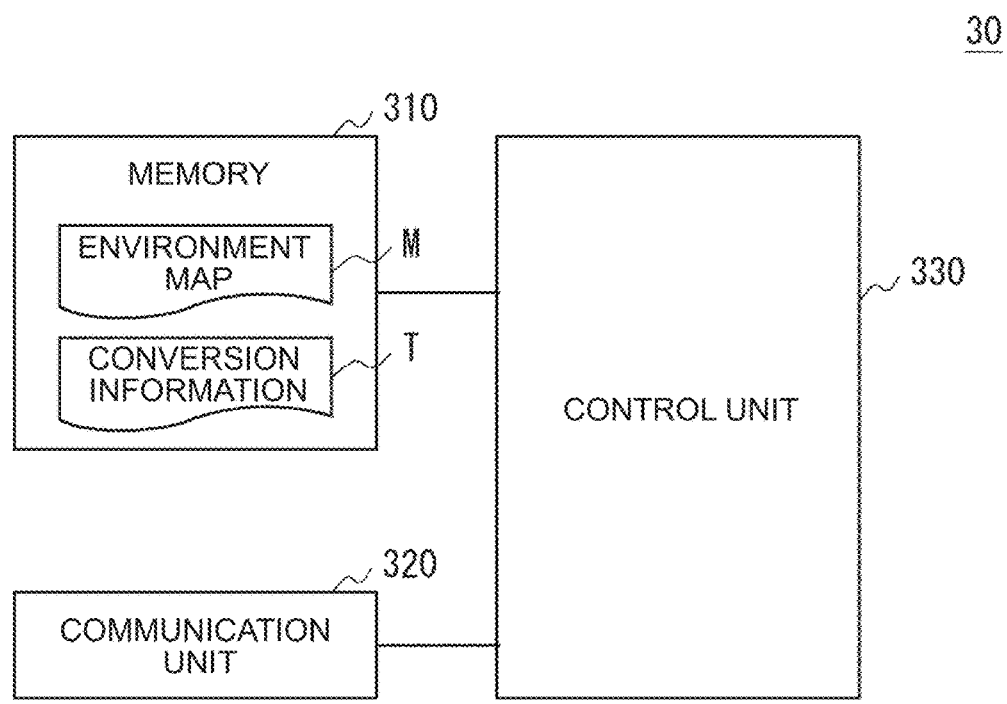
FIG. 8 is a block diagram illustrating the functional configuration of a server according to the first embodiment.

FIG. 8 is a block diagram illustrating the functional configuration of the server 30 according to the first embodiment. The server 30 includes a memory 310, a communication unit 320, and a control unit 330.

The memory 310 is a non-volatile storage medium, and may be a solid state drive, for example. The memory 310 stores various parameter values, functions, lookup tables, etc. to be used for control and computation, besides a control program for controlling the server 30. In particular, the memory 310 stores an environment map M and conversion information T.

The environment map M stored in the memory 310 is map information that is the same as the environment map M held by the robot 10.

The conversion information T is information for converting a hand-drawn input image into attribute information such as the position, shape, size, etc. of a regulated region. For example, the conversion information T may include a template for template matching and various parameters. The conversion information T may also include a trained model that receives an input of a hand-drawn input image and that outputs attribute information. The trained model may include a neural network.

The communication unit 320 is an interface for communication with the network N. The communication unit 320 receives a hand-drawn input image correlated with the environment map and transmitted from the management terminal 20, and delivers the hand-drawn input image to the control unit 330. In addition, the communication unit 320 transmits the regulated region information R to the robot 10 in cooperation with the control unit 330.

The control unit 330 is a processor such as a CPU, and executes control of the entire server 30 and various computation processes by executing a control program read from the memory 310. A specific process flow is described with reference to FIG. 9.

Figure 9:
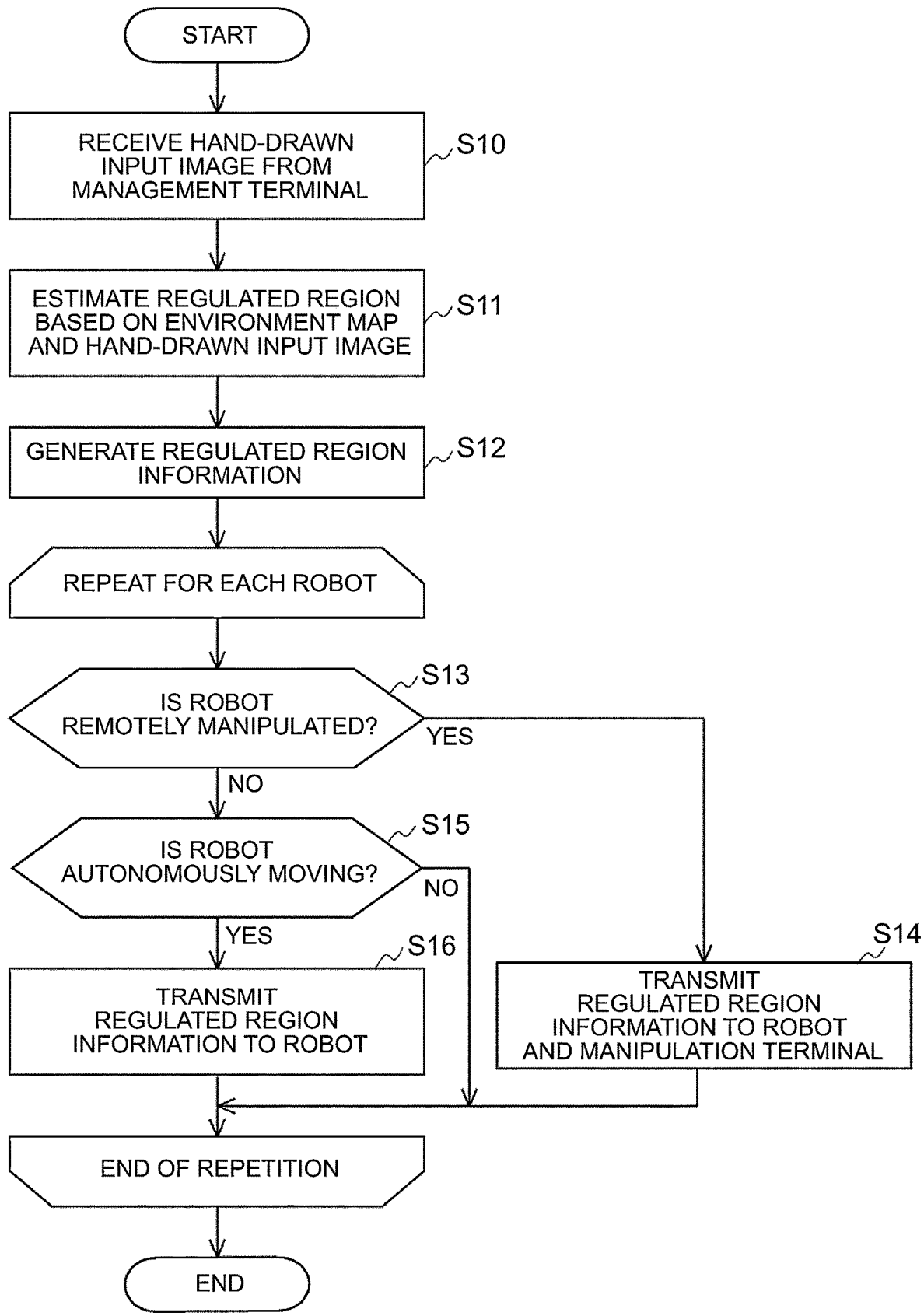
FIG. 9 is a flowchart illustrating the flow of a regulated region management method performed by the server according to the first embodiment.

FIG. 9 is a flowchart illustrating the flow of a regulated region management method performed by the server 30 according to the first embodiment.

First, when the communication unit 320 of the server 30 receives a hand-drawn input image correlated with the environment map M from the management terminal 20 (step S10), the control unit 330 estimates the position and the range of a regulated region based on the environment map M and the hand-drawn input image (step S11). For example, the control unit 330 may read the conversion information T stored in the memory 310, and estimate the position of a reference point of a regulated region on the environment map and the shape and the size of the regulated region from the hand-drawn input image using the conversion information T. The reference point may be the center of gravity, by way of example.

Next, the control unit 330 generates regulated region information R that indicates the estimated position and range of the regulated region (step S12).

Then, the control unit 330 transmits the regulated region information R to all the robots 10 via the communication unit 320. For a remotely manipulated robot 10, the control unit 330 transmits the regulated region information R also to a manipulation terminal that remotely manipulates the robot 10. Specifically, the control unit 330 repeatedly performs the processes indicated in steps S13 to S16 for each of the robots 10.

First, in step S13, the control unit 330 determines whether the robot 10 is remotely manipulated. When the robot 10 is remotely manipulated (Yes in step S13), the control unit 330 transmits the regulated region information R to the robot 10 and the manipulation terminal 40 that manipulates the robot 10 (step S14).

When the robot 10 is not remotely manipulated and the robot 10 is autonomously moving (No in step S13 and Yes in step S15), on the other hand, the control unit 330 transmits the regulated region information R to the robot 10 (step S16). At this time, when there is a manipulation terminal 40 corresponding to the robot 10, the control unit 330 may or may not transmit the regulated region information R to the manipulation terminal 40.

When the robot 10 is not remotely manipulated and is not autonomously moving such as when the robot 10 is not started (No in step S13 and No in step S15), the control unit 330 may or may not transmit the regulated region information R to the robot 10.

Information on whether the robot 10 is remotely operated, whether the robot 10 is autonomously moving, whether the robot 10 is not started, etc. may be transmitted in advance from each robot 10 to the server 30.

Figure 10:
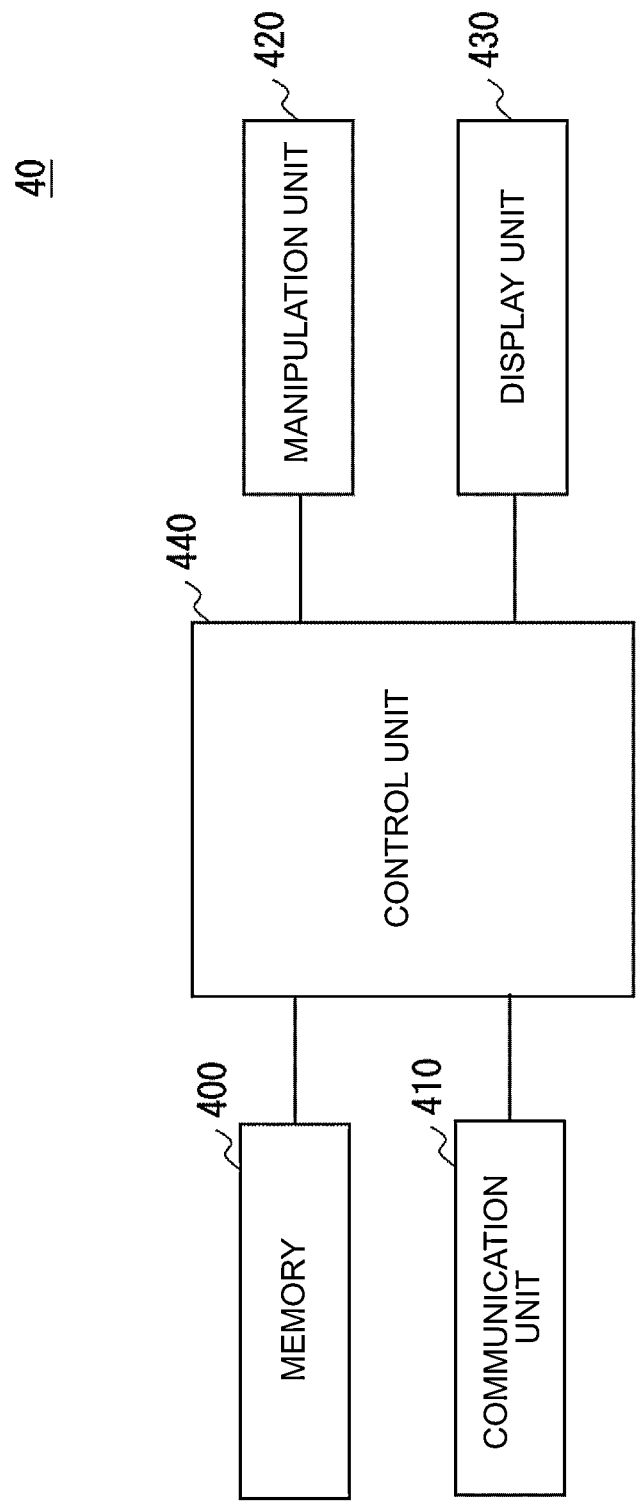
FIG. 10 is a block diagram illustrating the functional configuration of a manipulation terminal according to the first embodiment.

FIG. 10 is a block diagram illustrating the functional configuration of the manipulation terminal 40 according to the first embodiment. The manipulation terminal 40 includes a memory 400, a communication unit 410, a manipulation unit 420, a display unit 430, and a control unit 440.

The memory 400 is a non-volatile storage medium, and may be a solid state drive, for example. The memory 400 stores various parameter values, functions, lookup tables, etc. to be used for control and computation, besides a control program for controlling the manipulation terminal 40.

The communication unit 410 is an interface for communication with the network N. The communication unit 410 transmits a manipulation instruction, which is an input command, to the robot 10 in cooperation with the control unit 440. The communication unit 410 receives information that indicates an environment around the corresponding robot 10 from the server 30, and delivers the information to the control unit 440. The information that indicates an environment around the corresponding robot 10 may be the environment map M, or may be images of a surrounding scene captured by the stereo cameras 131 of the corresponding robot 10. The communication unit 410 delivers the regulated region information R received from the server 30 to the control unit 440.

The manipulation unit 420 is an input device that receives an input of a manipulation instruction from the manipulator. A method of inputting a manipulation instruction may be a command input, for example.

The display unit 430 is a liquid crystal panel, for example, and displays various information. For example, the display unit 430 displays information that indicates an environment around the robot 10.

The control unit 440 is a processor such as a CPU, and executes control of the entire manipulation terminal 40 and various computation processes by executing a control program read from the memory 400.

Figure 11:
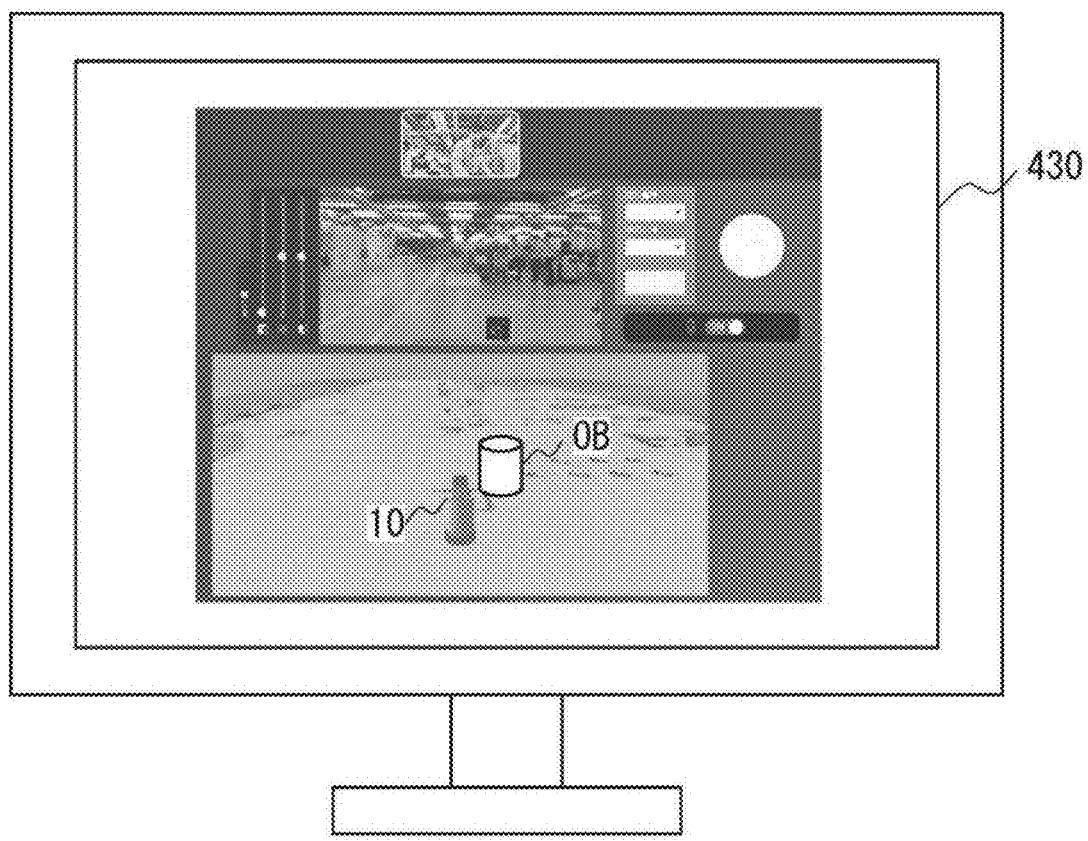
FIG. 11 illustrates an example of display on the manipulation terminal according to the first embodiment.

FIG. 11 illustrates an example of display on the manipulation terminal 40 according to the first embodiment. For example, the display unit 430 of the manipulation terminal 40 displays an image captured by the stereo cameras 131 of the corresponding robot 10. The display unit 430 displays an object OB that indicates a regulated region as superimposed at a position determined based on the regulated region information R on the captured image under control by the control unit 440. This allows the manipulator to intuitively grasp the position and the range of the regulated region, together with the environment around the robot 10, in the field of view of the robot 10. Thus, the manipulator can easily make an appropriate movement plan for the immediate future.

When the environment map M is received as information that indicates the surrounding environment, the display unit 430 may display an object that indicates a regulated region as superimposed on a predetermined region of the environment map M determined with reference to the corresponding robot 10 under control by the control unit 440. This allows the manipulator to objectively grasp the position and the range of the regulated region, together with the environment around the robot 10, in a wide field of view. Thus, the manipulator can easily make an appropriate total movement plan.

When a hand-drawn input image is input as a three-dimensional object, the manipulation terminal 40 may display the object OB that indicates a regulated region three-dimensionally. The same is true for a two-dimensional object. However, the manipulation terminal 40 may convert the mode of display of the object OB from three dimensions to two dimensions, or from two dimensions to three dimensions, in accordance with the mode of display of information that indicates the environment around the corresponding robot 10.

Figure 12:
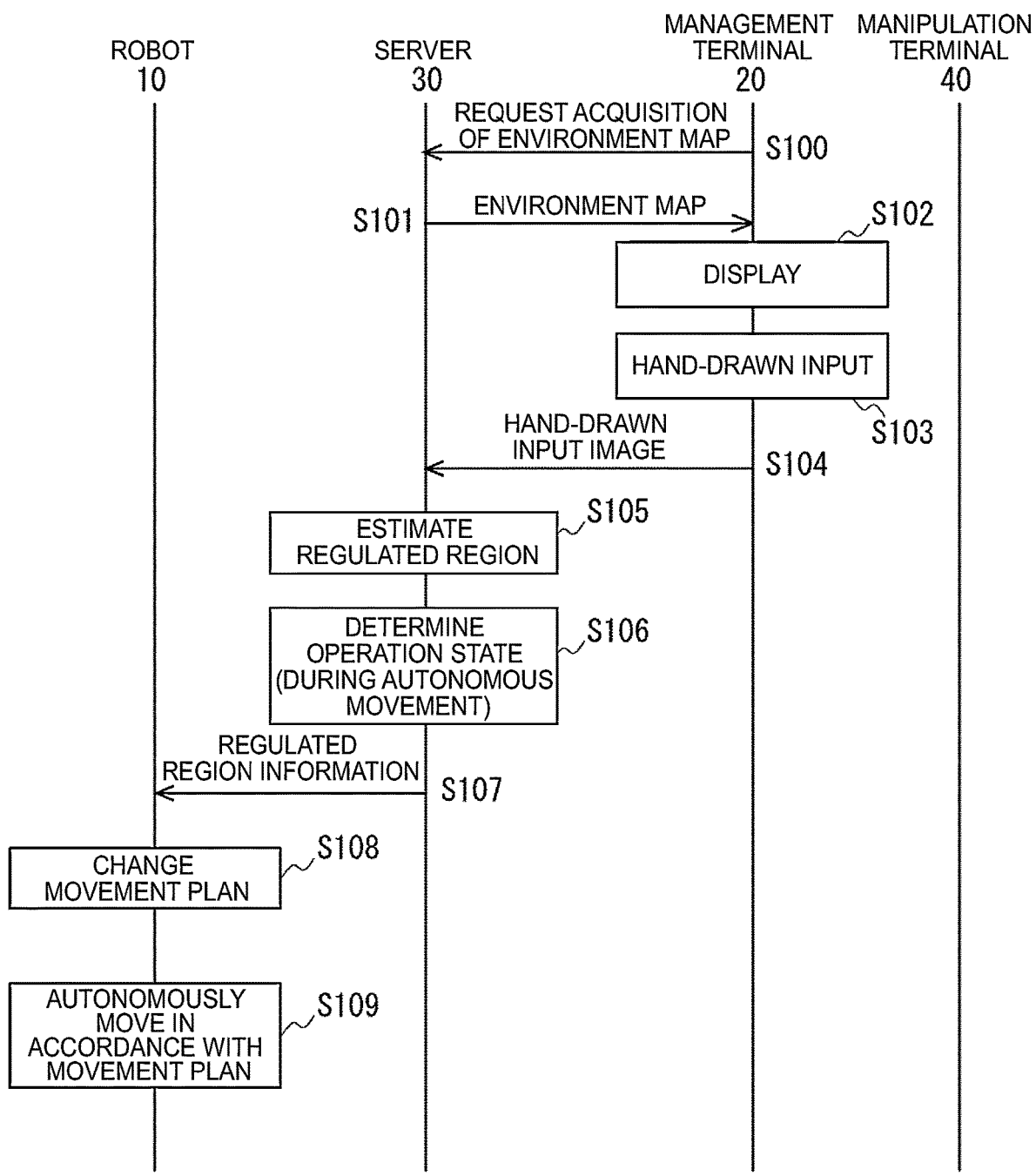
FIG. 12 is a sequence diagram illustrating the flow of a process performed by the mobile body management system according to the first embodiment.
Figure 13:
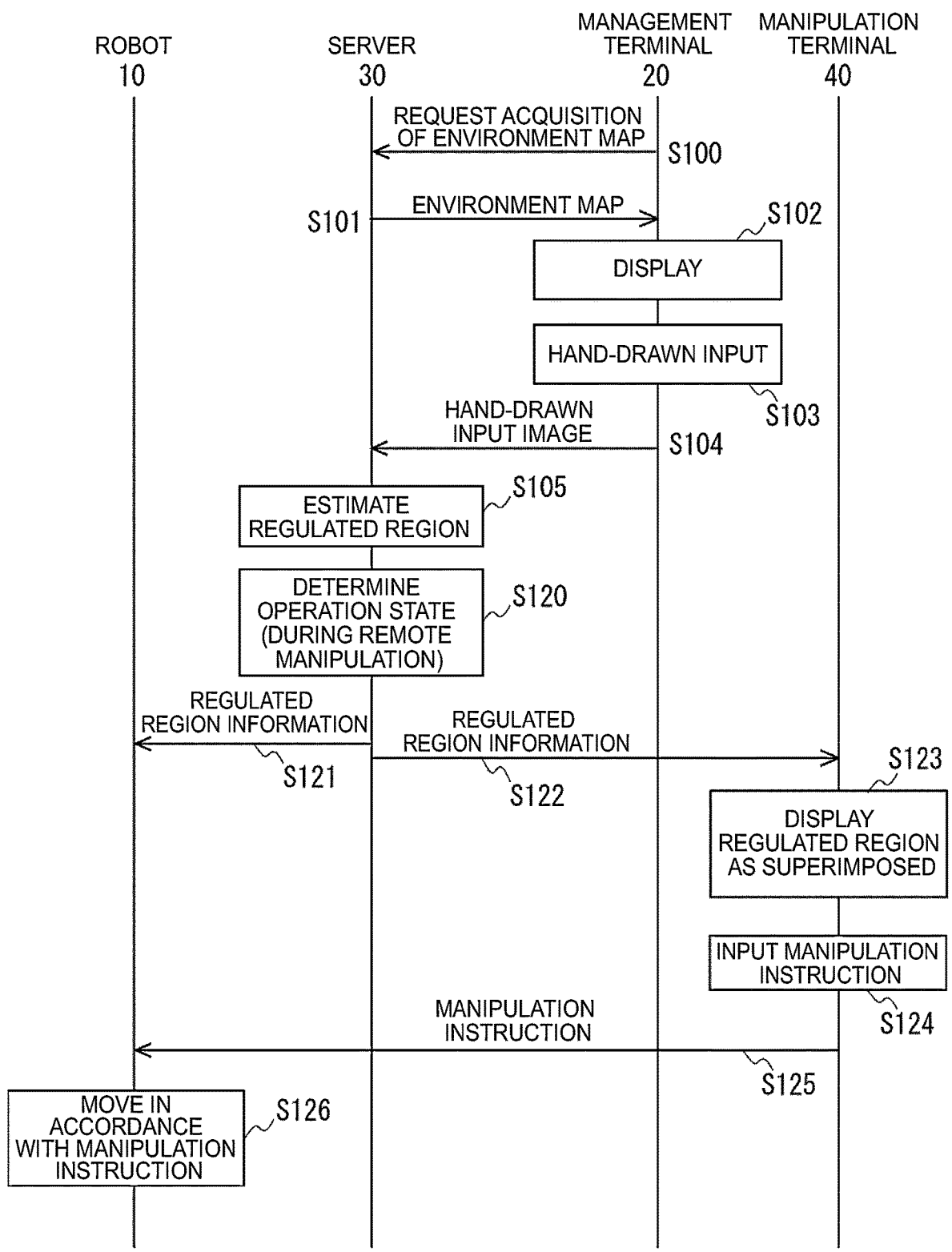
FIG. 13 is a sequence diagram illustrating the flow of a process performed by the mobile body management system according to the first embodiment.

FIGS. 12 and 13 are each a sequence diagram illustrating the flow of a process performed by the mobile body management system 1 according to the first embodiment. While the number of robots 10 is one in the drawings for convenience, this is not limiting.

The robot 10 may transmit, to the server 30, images of a surrounding scene captured by the stereo cameras 131 and information that indicates whether the robot 10 is remotely manipulated or is autonomously moving at predetermined time intervals while the robot 10 is moving. The server 30 that received the captured images may grasp information on the position of the robot 10 based on the captured images. The technique for grasping information on the position of the robot 10 is not limited thereto, and the robot 10 may use information from a global positioning system (GPS). When the robot 10 is remotely manipulated, the server 30 may transmit images captured by the robot 10 to the manipulation terminal 40 at predetermined time intervals and cause the display unit 430 to display the captured images.

FIG. 12 illustrates a flow for a case where the robot 10 is autonomously moving.

When there is a request to acquire an environment map from the management terminal 20 (step S100), the server 30 transmits the environment map M stored in the memory 310 to the management terminal 20 (step S101).

The management terminal 20 displays the received environment map M on the display unit 230 (step S102). Then, the management terminal 20 receives an input of a hand-drawn input image from the manager (step S103). The management terminal 20 transmits the hand-drawn input image to the server 30 in correlation with the environment map M (step S104).

The server 30 estimates a regulated region using the conversion information T based on the hand-drawn input image and the environment map M (step S105). Then, the server 30 generates regulated region information R. Then, the server 30 determines the operation state of the robot 10 (step S106). That is, the server 30 determines whether the robot 10 is remotely manipulated or is autonomously moving. In FIG. 12, the robot 10 is autonomously moving, and therefore the server 30 transmits the regulated region information R to the robot 10 (step S107), and does not transmit the regulated region information R to the manipulation terminal 40.

The robot 10 that received the regulated region information R changes a movement plan based on the regulated region information R and the environment map M held by the robot 10 itself (step S108). Then, the robot 10 autonomously moves in accordance with the changed movement plan (step S109).

FIG. 13 illustrates a flow for a case where the robot 10 is remotely manipulated. The mobile body management system 1 executes processes that are similar to those in steps S100 to S105. Then, the server 30 determines the operation state of the robot 10 (step S120). In FIG. 13, the robot 10 is remotely manipulated, and therefore the server 30 transmits the regulated region information R to both the robot 10 and the manipulation terminal 40 (steps S121 and S122). The server 30 may transmit the regulated region information R only to the manipulation terminal 40, and may not transmit the regulated region information R to the robot 10, since the robot 10 is remotely manipulated.

The manipulation terminal 40 that received the regulated region information R displays an object that indicates a regulated region as superimposed on an image captured by the robot 10 (step S123). The manipulation terminal 40 receives an input of a manipulation instruction from the manager who has grasped the regulated region (step S124), and transmits the manipulation instruction to the robot 10 (step S125).

The robot 10 that received the manipulation instruction moves in accordance with the manipulation instruction (step S126).

With the first embodiment, in this manner, the manager can designate a regulated region through an intuitive operation, that is, hand drawing. The regulated region designated by the manager may be a region with a static obstacle that has been changed or added, or may be a region that it is not desirable for the robot 10 to enter by human intention. The server 30 can instantly notify a subject that makes a movement plan of the thus designated regulated region. This allows the range of movement of the robot 10 to reflect a human intention in real time. This also saves the trouble of preparing an environment map in real time again each time the layout is partially changed or a new object is placed.

The manager may designate an obstacle that is not easily detectable by a sensor as a regulated region. Therefore, it is not necessary to additionally mount a dedicated sensor on the robot 10. Thus, the cost for introducing the robot 10 can be suppressed. In particular, the cost reduction effect becomes more significant as the number of robots 10 is increased.

The time of movement of the robot 10 can be shortened by the manager designating a large regulated region beforehand for a complicated passage such as a passage with a dead end due to an obstacle located ahead of a corner.

In this manner, the mobile body management system 1 can facilitate coexistence of humans and the robot 10.

The first embodiment can be modified as follows. While the server 30 distributes the regulated region information R to all the robots 10 at a time, the server 30 may transmit the regulated region information R to some of the robots 10 that have been designated, for example. In this case, the management terminal 20 receives, from the manager, an input of identification information for robots 10 to be subjected to the regulation together with a hand-drawn input image. The identification information for robots 10 may be information for identifying the purpose of use or the type of the robots 10. Alternatively, the identification information for robots 10 may be the model number of the robots 10, or may be the serial number of the robots 10. When identification information for robots 10 is acquired together with a hand-drawn input image, the server 30 transmits the regulated region information R to the robots 10 with the identification information. When the relevant robots 10 are remotely manipulated, the server 30 transmits the regulated region information R also to the manipulation terminals 40 that remotely manipulate the robots 10. At this time, the server 30 may not transmit the regulated region information R to the other robots 10 and the manipulation terminals 40 that remotely manipulate the other robots 10.

In this manner, it is possible to flexibly apply regulations by making the regulated region different among the types of the robots 10 or among the robots 10.

While the regulated region information R affects the movement plan for the carriage portion 110, an operation plan for the main body portion 120 may additionally be affected, for example. The operation plan determines the direction and the amount of future operation of the portion, and determines the direction and the amount of future expansion and contraction of the portion when the portion is expandable and contractible. By way of example, the robot 10 may generate an operation plan for the arm 123 so as to detour around the regulated region. Specifically, the robot 10 estimates a movable range of the robot 10 based on the regulated region information R and the movement plan, and generates an operation plan for the arm 123 of the robot 10 based on the estimated movable range.

In this manner, autonomous movement of the robot 10 can be suitably assisted by reflecting the regulated region information R in the operation plan for the entire robot 10.

Second Embodiment

Next, a second embodiment of the present disclosure will be described. In the second embodiment, the manager can designate not only the position and the range of a regulated region but also additional information associated with the regulated region through a hand-drawn input image.

For example, the manager may be able to designate the type of the regulation by inputting hand-written characters using a finger or a stylus pen. The type of the regulation may be a height restriction, a width restriction, a speed limit, or prohibition of entry, by way of example. In this case, the regulated region information R includes information that indicates the position and the range of a regulated region and information that indicates the type of the regulation.

Figure 14:
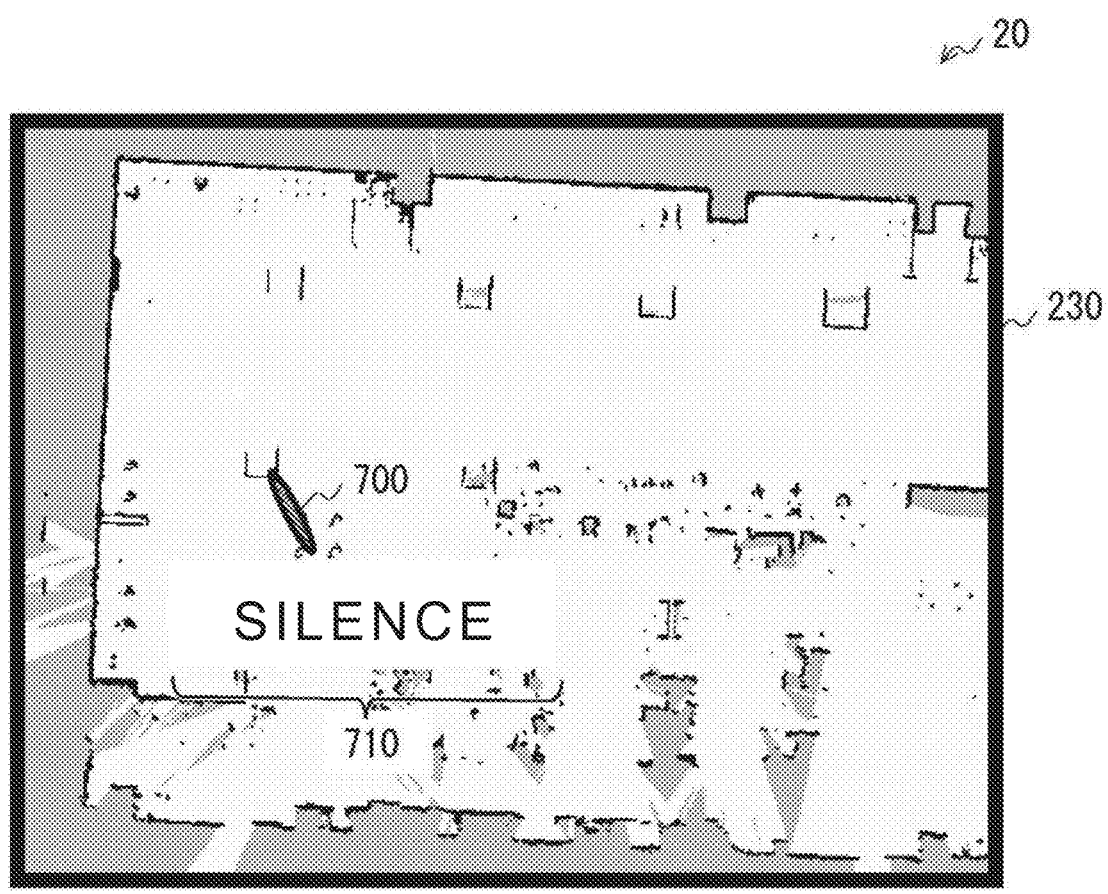
FIG. 14 illustrates an example of a hand-drawn input image according to a second embodiment.

FIG. 14 illustrates an example of the hand-drawn input image according to the second embodiment. The display unit 230 displays hand-drawn input images 700, 710. The hand-drawn input image 700 indicates the position and the range of a regulated region as viewed in plan. The hand-drawn input image 710 indicates characters that represent the type of the regulation. In the present example, the hand-drawn input image 710 indicates characters "SILENCE", which may indicate that the type of the regulation is a speed limit.

The server 30 that received such hand-drawn input images extracts an image region (hand-drawn input image 700) that indicates a figure and an image region (hand-drawn input image 710) that indicates characters from the hand-drawn input images. Next, the server 30 estimates the position and the range of a regulated region based on the environment map M and the image region that indicates a figure. The server 30 also estimates the type of the regulation from the image region that indicates characters using a known technique such as optical character recognition (OCR). Then, the server 30 generates information that indicates a regulated region and information that indicates the type of the regulation as the regulated region information R.

The manager may designate the type of the regulation by designating the color of a hand-drawn input image. In this case, the type of the regulation has been determined in advance in correspondence with the color. For example, the green color may indicate a speed limit, and the blue color may indicate a height restriction.

The server 30 that received a hand-drawn input image including a colored figure extracts coordinate information and color information from the hand-drawn input image. Then, the server 30 estimates the position and the range of a regulated region based on the environment map M and the coordinate information. The server 30 also estimates the type of the regulation based on the color information. The server 30 generates information that indicates a regulated region and information that indicates the type of the regulation as the regulated region information R.

The manager may express the type of the regulation using a figure that is different from the figure that indicates the position and the range of a regulated region as viewed in plan.

Figure 15:
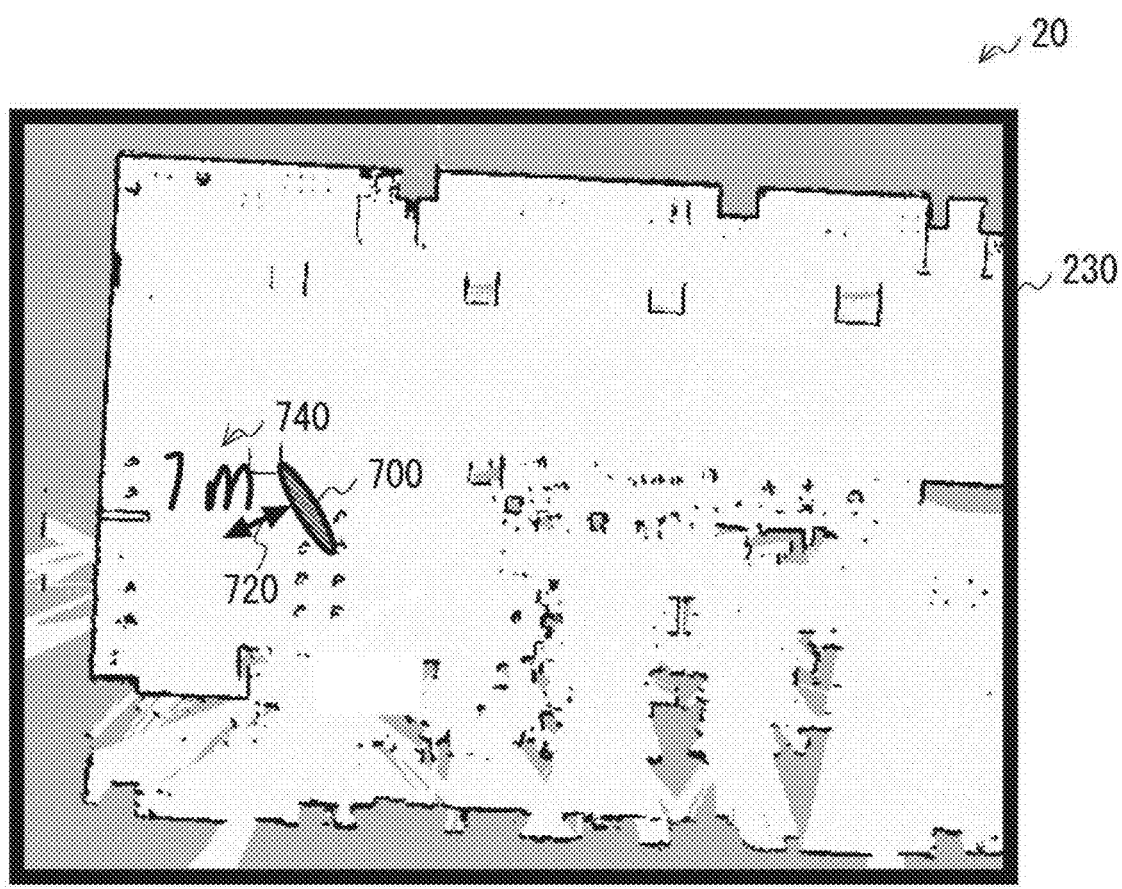
FIG. 15 illustrates an example of a hand-drawn input image according to the second embodiment.

FIG. 15 illustrates an example of the hand-drawn input image according to the second embodiment. When an obstacle is present at a location at a predetermined height or more from the floor or when the ceiling is low, for example, the type of the regulation indicates a height restriction. At this time, the manager inputs two types of figures, that is, a figure (hand-drawn input image 700) that indicates the position and the range of an obstacle as viewed in plan and a figure (hand-drawn input image 720) that indicates the presence of an obstacle at a position at a predetermined height or more, on the environment map M, for example. The manager may input a specific value of the height at which the obstacle is present using hand-written characters correlated with the hand-drawn input image 720, as indicated by a hand-drawn input image 740.

The server 30 that received such hand-drawn input images extracts image regions (hand-drawn input images 700, 720) that indicate a figure and an image region (hand-drawn input image 740) that indicates characters from the hand-drawn input images.

The server 30 extracts an image region that indicates the position and the range of an obstacle (also called "first figure") as viewed in plan and an image region that indicates a figure (also called "second figure") that indicates the presence of an obstacle at a location at a predetermined height or more from the image regions that indicate a figure. Then, the server 30 estimates the position and the range of a regulated region as viewed in plan based on the first figure, and recognizes the presence of the regulated region at a location at a predetermined height or more based on the second figure. For the image region that indicates characters, the server 30 recognizes the specific height using the OCR discussed above etc.

With the second embodiment, in this manner, the manager can intuitively designate a regulated region in more detail.

When the regulated region information R including information that indicates the type of the regulation is received, the robot 10 that is autonomously moving may generate a movement plan as follows.

First, the robot 10 generates a movement path on the basis of the environment map M, the position and the range of a regulated region, and the type of the regulation. Then, the robot 10 estimates the mode of movement in the regulated region based on the type of the regulation.

When the type of the regulation is prohibition of entry, by way of example, the robot 10 generates a movement path so as to detour around the regulated region. When the type of the regulation is a speed limit, by way of example, a movement path including the regulated region is generated. However, the robot 10 sets the speed in the regulated region within a restricted speed range. When the type of the regulation is a width restriction or a height restriction, by way of example, it is determined in consideration of the dimensions of the robot 10 whether the robot 10 can enter the regulated region. The robot 10 may generate a movement path including the regulated region when the robot 10 can enter the regulated region, and may generate a movement path so as to detour around the regulated region when the robot 10 cannot enter the regulated region. When the robot 10 cannot enter the regulated region but the robot 10 can enter the regulated region with an expandable/contractible movable portion such as the arm 123 contracted vertically or laterally, the robot 10 generates a movement path including the regulated region, and generates an operation plan for the movable portion so as to cause the movable portion to be contracted when the robot 10 passes through the regulated region.

Third Embodiment

Next, a third embodiment of the present disclosure will be described. In the third embodiment, the robot 10 that is remotely manipulated autonomously controls itself so as to detour around a regulated region, against a manipulation instruction from the manipulation terminal 40, when it is predicted that the robot 10 enters the regulated region if the robot 10 is moved in accordance with the manipulation instruction.

Figure 16:
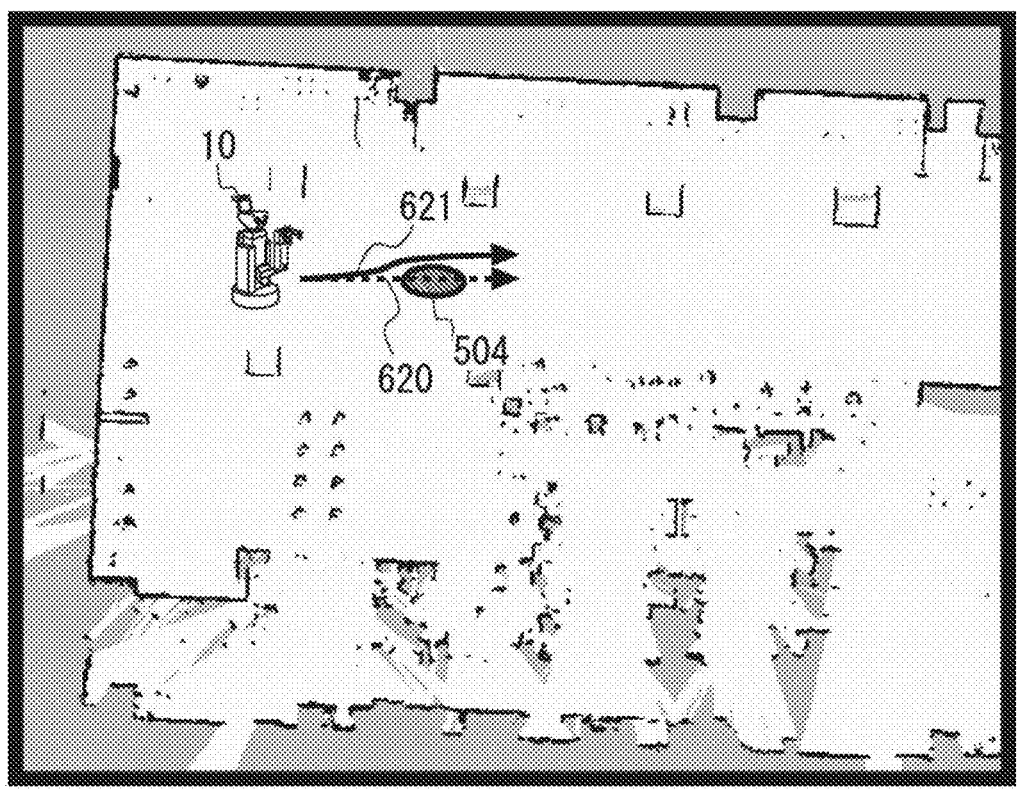
FIG. 16 illustrates autonomous control of a remotely manipulated robot according to a third embodiment.

FIG. 16 illustrates autonomous control of the remotely manipulated robot 10 according to the third embodiment. A movement path 620 indicates a movement path for the robot 10 according to a manipulation instruction. A water pool 504 designated as a regulated region is present on the movement path 620. Thus, it is predicted that the robot 10 will be caught in the water pool 504 if the robot 10 keeps following the manipulation instruction. Thus, the robot 10 autonomously changes the movement path to a movement path 621 that causes the robot 10 to travel in a direction indicated by the manipulation instruction while detouring around the water pool 504.

Figure 17:
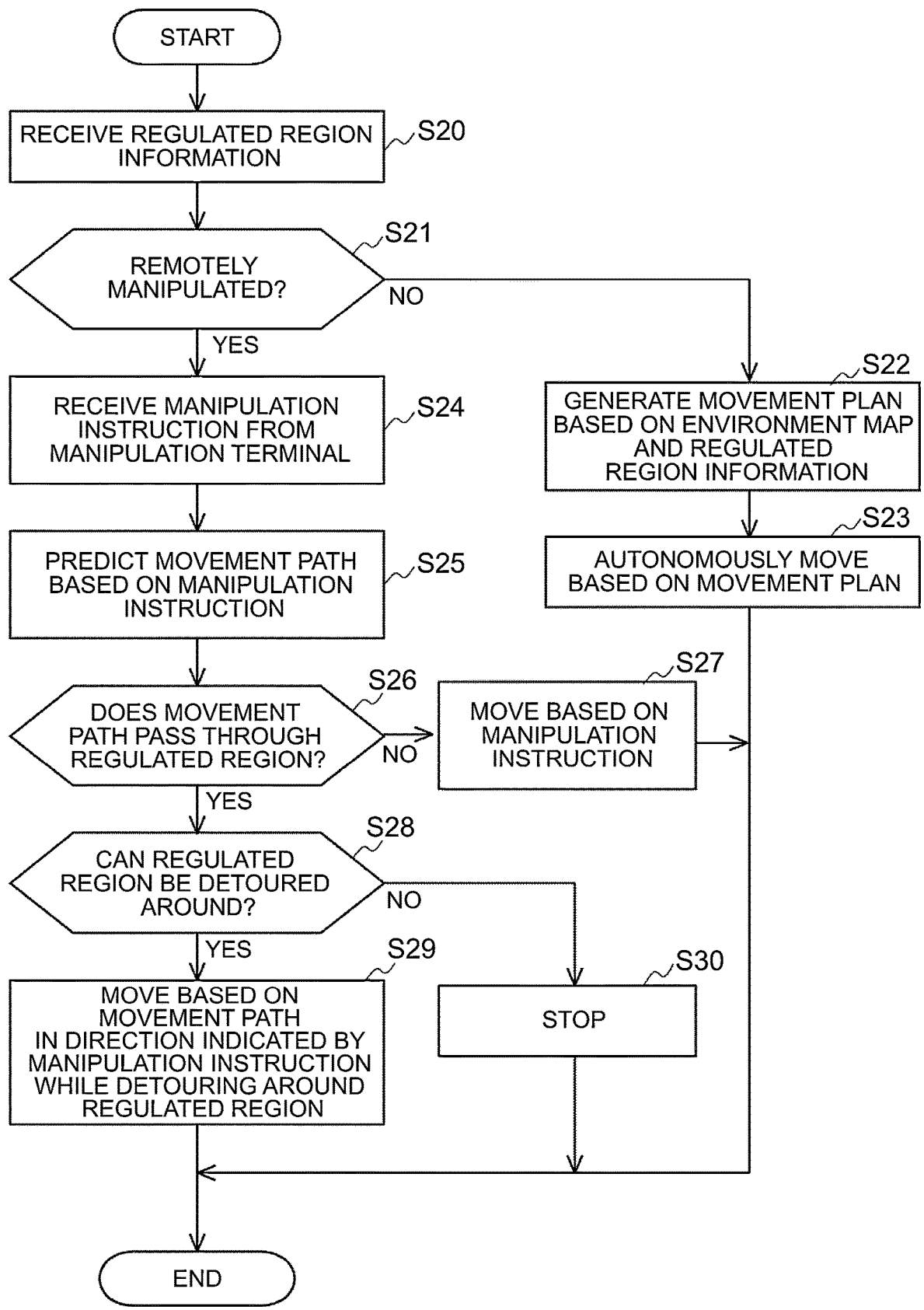
FIG. 17 is a flowchart illustrating the flow of a movement method performed when the robot according to the third embodiment moves.

FIG. 17 is a flowchart illustrating the flow of a movement method performed when the robot 10 according to the third embodiment moves. First, the robot 10 receives regulated region information R from the server 30 (step S20). When the robot 10 is autonomously moving rather than being remotely manipulated (No in step S21), a movement plan is generated based on the environment map M and the regulated region information R (step S22). Then, the robot 10 autonomously moves based on the movement plan (step S23).

When the robot 10 is remotely manipulated (Yes in step S21), on the other hand, a manipulation instruction from the manipulation terminal 40 is received (step S24). Next, the robot 10 predicts a movement path based on the manipulation instruction (step S25). The robot 10 determines whether the predicted movement path passes through a regulated region (step S26). When the predicted movement path does not pass through a regulated region (No in step S26), the robot 10 moves based on the manipulation instruction (step S27). When the predicted movement path passes through a regulated region (Yes in step S26), on the other hand, the robot 10 determines whether the regulated region can be detoured around (step S28). Specifically, the robot 10 determines whether it is possible to generate a movement plan that detours around the regulated region while traveling in a direction indicated by the manipulation instruction. If the regulated region can be detoured around (Yes in step S28), the robot 10 moves in a direction indicated by the manipulation instruction while detouring around the regulated region based on the newly generated movement plan (step S29). When the regulated region cannot be detoured around (No in step S28), on the other hand, movement of the robot 10 is forcibly stopped (step S30).

With the third embodiment, in this manner, the robot 10 autonomously controls itself in an emergency, while being remotely manipulated. Thus, the mobile body management system 1 can reduce a burden on the manipulator, and facilitate coexistence of humans and the robot 10.

Application Examples

Next, examples of application of the mobile body management system 1 according to the first to fourth embodiments will be described.

Management of Robots at Work Sites

The mobile body management system 1 can be used to manage robots at work sites. For example, when work on the ceiling or at a height is expected, the manager designates a region under the work location as a regulated region for the robot 10 that moves on the ground. It is difficult for the robot 10 that moves on the ground to detect a work location at a height. With the mobile body management system 1, however, the manager can designate a regulated region, and therefore the robot 10 is prevented from entering a dangerous location.

Management of Robots at Commercial Facilities

The mobile body management system 1 can be used to manage robots at commercial facilities. For example, when a special event site is prepared, the manager can easily inform the robot 10 of the arrangement of walls and objects at the event site using the management terminal 20. This allows the robot 10 to grasp traffic lines at the site.

Management of Robots for Transfer in Warehouses

The mobile body management system 1 can be used to manage robots for transfer in warehouses. For example, when an object is temporarily placed on the floor of a passage to temporarily narrow the passage, the manager designates a regulated region so as to block the passage using the management terminal 20. At this time, the manager may designate the type of the regulation as prohibition of entry or prohibition of passage. This allows the robot 10 to move so as to detour around the narrowed passage.

Management of Outdoor Robots

The mobile body management system 1 can be used to manage outdoor robots. For example, when there is a water pool at an outdoor location, the manager sets a regulated region so as to surround the water pool using the management terminal 20. This allows the robot 10 to move so as to detour around the water pool, which prevents a fault due to immersion in water.

The present disclosure is not limited to the above embodiments, and can be modified as appropriate without departing from the spirit and scope of the present disclosure. While the server 30 transmits the regulated region information R to the robot 10 and the manipulation terminal 40 each time the regulated region is updated in the embodiments discussed above, the server 30 may transmit only updated information.

While the manipulation terminal 40 transmits a manipulation instruction to the robot 10 via the network N, the manipulation terminal 40 may transmit a manipulation instruction directly to the robot 10 through near-field wireless communication etc., or may transmit a manipulation instruction to the robot 10 via the server 30.

While the regulated region information R is generated by the server 30, the regulated region information R may be generated by the management terminal 20. In this case, the management terminal 20 may transmit the regulated region information R to the robot 10 not via the server 30.

When a period for which a regulation is enforced in a regulated region is determined, the management terminal 20 may receive an input of the term of validity together with a hand-drawn input image, and transmit information on the term of validity to the server 30 together with the hand-drawn input image. In this case, the server 30 may manage the term of validity for each regulated region. Then, when the term of validity of the regulated region expires, the server 30 may update the regulated region information R so as to delete the relevant regulated region. The server 30 may roll out the updated regulated region information R to the robot 10 and the manipulation terminal 40 in accordance with the update of the regulated region information R.

While the robot 10 is mentioned as an example of a mobile body, this is not limiting, and the mobile body may be a vehicle, an unmanned aircraft (drone), etc. The mobile body may be basically moved through a remote operation. In this case, the autonomous movement function may be omitted.

What is claimed is:

1. A regulated region management system comprising:
one or more processors configured to:
acquire a hand-drawn input image input to an environment map;

estimate a regulated region based on the environment map and the hand-drawn input image by reading stored conversion information and estimating a position of a reference point of the regulated region and a shape and a size of the regulated region using the stored conversion information, the regulated region corresponding to a region in which entry of a mobile body is regulated;

transmit regulated region information that indicates the regulated region to the mobile body in response to the mobile body not being remotely manipulated using a manipulation terminal; and transmit the regulated region information to the manipulation terminal in response to the mobile body being remotely manipulated using the manipulation terminal.

2. The regulated region management system according to claim 1, wherein the one or more processors are configured to transmit the regulated region information to the mobile body.

3. The regulated region management system according to claim 1, wherein the one or more processors are configured to:

extract coordinate information and color information from the hand-drawn input image;

estimate the regulated region based on the environment map and the coordinate information;

estimate a type of a regulation based on the color information; and generate information that indicates the regulated region and information that indicates the type of the regulation as the regulated region information.

4. The regulated region management system according to claim 1, wherein the one or more processors are configured to:

transmit, in response to identification information on the mobile body being acquired together with the hand-drawn input image and the mobile body not being remotely manipulated using the manipulation terminal, the regulated region information to the mobile body with the identification information; and transmit, in response to the identification information on the mobile body being acquired together with the hand-drawn input image and the mobile body with the identification information being remotely manipulated, the regulated region information to the manipulation terminal that is used to remotely manipulate the mobile body with the identification information.

5. A mobile body management system comprising:
the regulated region management system according to claim 1; and
the mobile body.

6. The mobile body management system according to claim 5, wherein the mobile body is configured to generate a movement plan for autonomous movement of the mobile body based on the environment map and the regulated region information in response to receiving the regulated region information in response to the mobile body autonomously moving.

7. The mobile body management system according to claim 6, wherein:
the mobile body includes a movable portion that acts differently from movement of the mobile body in a travel direction; and
the mobile body is configured to, in response to the mobile body autonomously moving,
estimate a movable range of the mobile body based on the regulated region information and the movement plan, and
generate an operation plan for the movable portion of the mobile body based on the movable range.

8. The mobile body management system according to claim 5, further comprising the manipulation terminal correlated with the mobile body and configured to:
display the regulated region in response to receiving the regulated region information, and
transmit, in response to a manipulation instruction being received from a manipulator, the manipulation instruction to the corresponding mobile body.

9. The mobile body management system according to claim 8, wherein the mobile body is configured to generate a movement plan to detour around the regulated region, or stop moving, in a case where a prediction is made that the mobile body enters the regulated region in response to the mobile body moving in accordance with the manipulation instruction received from the corresponding manipulation terminal.

10. The regulated region management system according to claim 1, wherein the reference point includes a center of gravity.

11. The regulated region management system according to claim 10, wherein the stored conversion information includes a template for template matching, one or more parameters, and a trained model that is configured to receive the hand-drawn input image and output attribute information, the attribute information including the position, the shape, and the size of the regulated region.

12. A regulated region management method comprising:
acquiring a hand-drawn input image input to an environment map;
estimating a regulated region based on the environment map and the hand-drawn input image by reading stored conversion information and estimating a position of a reference point of the regulated region and a shape and a size of the regulated region using the stored conversion information, the regulated region corresponding to a region in which entry of a mobile body is regulated;
transmitting regulated region information that indicates the regulated region to the mobile body in response to the mobile body not being remotely manipulated using a manipulation terminal; and
transmitting the regulated region information to the manipulation terminal in response to the mobile body not being remotely manipulated using the manipulation terminal.

13. A non-transitory storage medium that stores instructions that are executable by one or more processors and that cause the one or more processors to execute functions comprising:
acquiring a hand-drawn input image input to an environment map;
estimating a regulated region based on the environment map and the hand-drawn input image by reading stored conversion information and estimating a position of a reference point of the regulated region and a shape and a size of the regulated region using the stored conversion information, the regulated region corresponding to a region in which entry of a mobile body is regulated;
transmitting regulated region information that indicates the regulated region to the mobile body in response to the mobile body not being remotely manipulated using a manipulation terminal; and
transmitting the regulated region information to the manipulation terminal in response to the mobile body being remotely manipulated using the manipulation terminal.

* * * * *